UNITED STATES PATENT OFFICE.

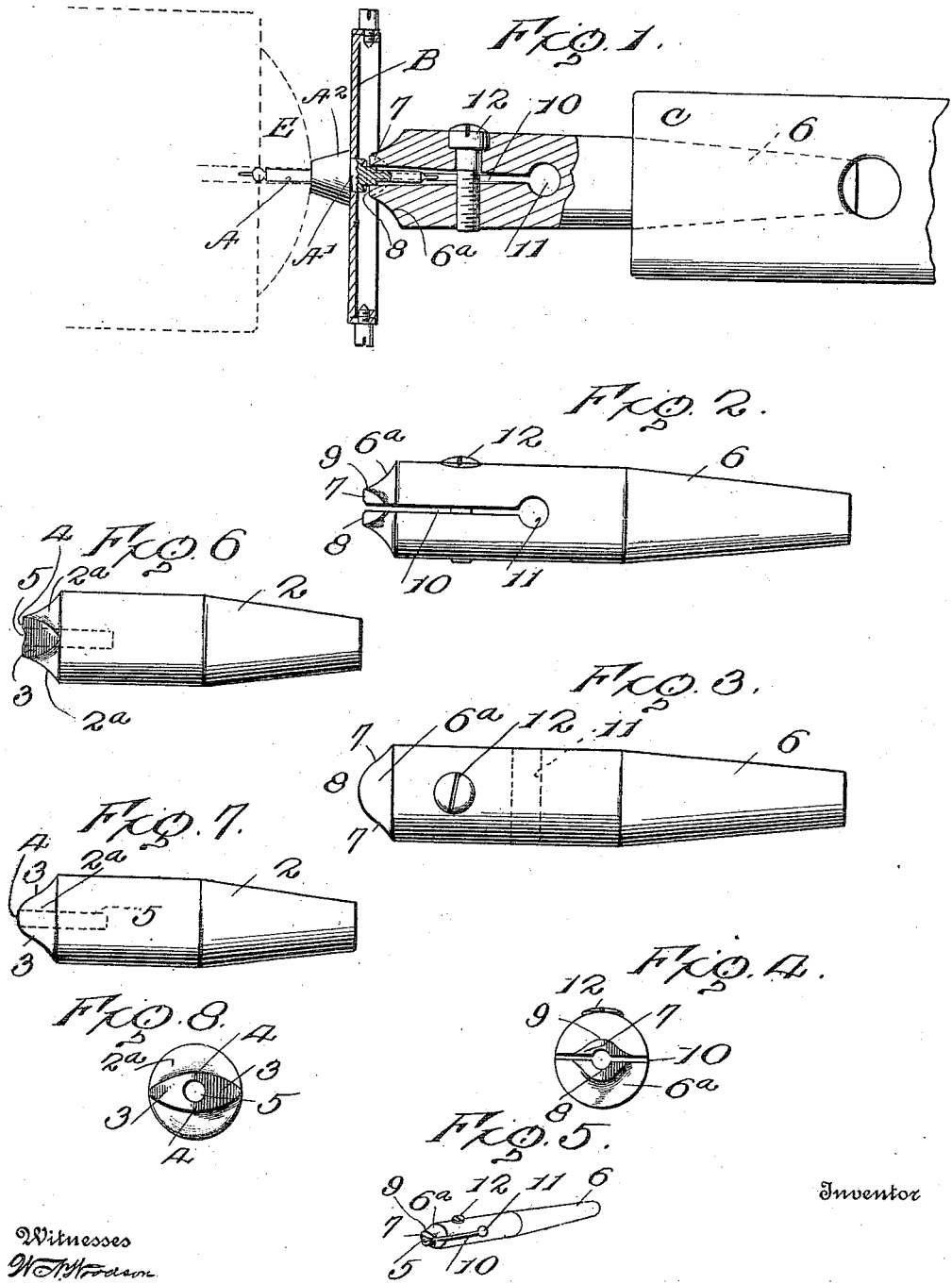

FRANK W. BECHBERGER, OF NORWALK, OHIO.

WATCHMAKER'S TOOL.

983,018.

Specification of Letters Patent.   Patented Jan. 31, 1911.

Application filed April 7, 1910.   Serial No. 554,053.

*To all whom it may concern:*

Be it known that I, FRANK W. BECHBERGER, citizen of the United States, residing at Norwalk, in the county of Huron and State of Ohio, have invented certain new and useful Improvements in Watchmakers' Tools, of which the following is a specification.

This invention relates to a watch-maker's tool designed to unite a balance-wheel and the staff thereof, the object of the invention being to provide a very small tool adapted to be placed in the tail-stock of a watchmaker's lathe which will act to burnish the usual undercut portion of the shoulder on the staff holding the balance-wheel so that this undercut shoulder shall be turned over or burnished over into the balance-staff hub, thus uniting the staff and balance-wheel firmly.

Two forms of my invention are shown wherein:—

Figure 1 is an enlarged elevation of my improved tool showing it placed in a lathe, and in operation, the balance-wheel and part of the tool being shown in section. Fig. 2 is an elevation of the tool. Fig. 3 is an elevation of the tool, but at right angles to the elevation shown in Fig. 2. Fig. 4 is an end view of the improved tool, and Fig. 5 is a perspective view of the tool showing it in its natural size. Fig. 6 is an elevation of a modified form of tool. Fig. 7 is an elevation of the tool, but at right angles to Fig. 6. Fig. 8 is an end view of the modified form.

Corresponding and like parts are referred to in the following description and indicated in all the views of the accompanying drawing by the same reference characters.

Referring to the form shown in Figs. 6, 7 and 8 my improved tool comprises a tapered shank portion 2, which at one end is reduced as at 2ª and is concavely beveled on opposite sides as at 3, the extremity of the tool being rounded as at 4, so that the concavely beveled sides of the outer end of the tool merge into a convexly rounded edge. The tool in the form shown in Fig. 6 is formed with a longitudinal recess 5 which is, of course, in the exact center of the tool, and which is adapted to receive and turn loosely upon that portion of the staff which takes the hair-spring collet.

Before illustrating the manner of using this tool, I will describe the preferred form thereof which is shown in Figs. 1 to 5. In this form 6 designates the tapered shank of the tool which, as before remarked, is adapted to be received in the tail-stock of a watch-maker's lathe, and which is also reduced at one end as at 6ª. The oppositely beveled sides 7 of the forward end of the tool, have precisely the same form as that shown in the previously described figure, and have their ends convexly rounded as at 8, to form burnishing terminals 9. Instead of having the shank merely provided with the longitudinally extending passage 5, as previously described, the shank is also split as at 10, midway between the concavely beveled ends and at its rear extremity. This slot is enlarged as at 11. A screw 12 passes through the shank of the tool and connects the two portions of the end thereof on each side of the slot so that by turning the screw 12 the two portions of the bifurcated end of the tool may be brought together or opened apart, so that it may be adjusted to run smoothly and snugly upon the balance-staff or arbor.

In practical use the balance-staff or arbor A is placed in the lathe chuck E. The balance-wheel B is then placed upon the hub A' and against the shoulder A². It is this hub A' which is to be overturned upon the balance-wheel. The tool C is adjusted to just slip over the portion of the staff taking the hair-spring collet, thus bringing the burnishing edges 4 or 8 of the tool in contact with the undercut portion of the hub A' so that by a steady pressure upon the end of the tail-stock spindle, the tail-stock may be forced inward, thus turning this undercut shoulder, or burnishing end over the balance-bar or hub, it being understood, of course, that the tail-stock spindle is to be held from rotation and the tool C is pressed against the staff with its rounded burnishing ends engaging with the face of the undercut shoulder or hub A'.

While I do not wish to limit myself to a tool having two burnishing edges or terminals, as for instance, the terminals 9—9, I prefer them for simplicity of construction, and find them entirely practical in use.

The tools above described are entirely effective for the work intended and act to firmly unite the balance-wheel to the balance-staff.

Having thus described the invention what is claimed as new is:—

1. A watch-maker's tool of the character described, comprising a tapered shank having a central longitudinal recess to receive a balance-staff, the end of the shank at the opening of the recess being formed with rounded burnishing terminations disposed diametrically across the axis of the tool.

2. A watch-maker's tool of the character described, comprising a tapered shank, one extremity of the shank being beveled on opposite sides and having a rounded terminating edge merging into said beveled portions and extending diametrically across the axis of the shank, said beveled end of the shank being provided with a longitudinally extending recess adapted to receive a balance-staff, said recess being disposed at the axial center of the shank.

3. A watch-maker's tool of the character described, comprising a tapered shank, the larger end of the shank being longitudinally split, and adapted to receive a balance-staff, means for adjusting said split portion of the staff upon the balance-staff of a watch, said shank at its larger end being oppositely beveled and terminating in a rounded burnishing edge merging into said beveled portions.

4. A watch-maker's tool of the character described, comprising a tapered shank split at one end, a screw passing through the shank on each side of said split portion, the split portion of the tool being adapted to receive a balance-staff, the extremity of the tool being oppositely beveled transversely to the plane of the slot, the extremity of the tool being rounded, the beveled sides of the tool merging into the rounded edge thereof.

In testimony whereof, I affix my signature in presence of two witnesses.

FRANK W. BECHBERGER. [L. S.]

Witnesses:
C. A. RONK,
CLAYTON C. GRUNDY.